United States Patent
McGarry

(10) Patent No.: US 10,277,735 B2
(45) Date of Patent: Apr. 30, 2019

(54) INDIVIDUAL TELEPHONE NUMBER ASSIGNMENT

(71) Applicant: Neustar, Inc., Sterling, VA (US)

(72) Inventor: Thomas G. McGarry, Arlington, VA (US)

(73) Assignee: Neustar, Inc., Sterling, VA (US)

( * ) Notice: Subject to any disclaimer, the term of this patent is extended or adjusted under 35 U.S.C. 154(b) by 0 days.

(21) Appl. No.: 15/456,081

(22) Filed: Mar. 10, 2017

(65) Prior Publication Data

US 2018/0262615 A1 Sep. 13, 2018

(51) Int. Cl.
*H04M 7/00* (2006.01)
*H04M 3/42* (2006.01)
*H04Q 3/00* (2006.01)

(52) U.S. Cl.
CPC ........ *H04M 3/42297* (2013.01); *H04Q 3/005* (2013.01); *H04Q 2213/097* (2013.01); *H04Q 2213/13097* (2013.01); *H04Q 2213/13542* (2013.01)

(58) Field of Classification Search
CPC .............. H04M 3/42297; H04O 3/005; H04O 2213/097
USPC .... 379/221.13, 221.01–221.03, 219, 207.02, 379/220.01
See application file for complete search history.

(56) References Cited

U.S. PATENT DOCUMENTS

| | | | | |
|---|---|---|---|---|
| 6,081,590 A | * | 6/2000 | Crowley | H04Q 3/005 379/220.01 |
| 6,122,362 A | * | 9/2000 | Smith | H04M 3/42229 358/450 |
| 6,169,793 B1 | * | 1/2001 | Godwin | H04M 3/42229 379/221.09 |
| 6,707,810 B1 | | 3/2004 | Neel | |
| 6,748,069 B1 | * | 6/2004 | Nimmagadda | H04Q 3/005 379/127.01 |
| 7,106,844 B1 | * | 9/2006 | Holland | H04M 3/42255 379/201.01 |
| 7,120,236 B1 | * | 10/2006 | Schneider | G06Q 99/00 379/201.01 |
| 7,436,851 B1 | | 10/2008 | Chambers | |

(Continued)

*Primary Examiner* — William J Deane, Jr.
(74) *Attorney, Agent, or Firm* — Perkins Coie LLP

(57) ABSTRACT

Systems and methods for individual telephone numbering assignment and administration in a telecommunications network are disclosed. Particularly, the invention relates to the concept of acquiring individual telephone numbers instead of acquiring a block of telephone numbers from an administration agency. According to disclosed embodiments, the system and method allow a carrier to request an individual telephone number from a numbering administrator. The numbering administrator verifies that the carrier is authorized to request an individual telephone in a particular geographic area. If the carrier is authorized, the numbering administrator obtains an individual telephone number from its database and provides it to the carrier. The carrier initiates an intra-carrier assignment with an administrative agency to get the individual telephone number assigned to it. The administrative agency processes the assignment activation request, and upon completion of the addignment process, notifies all carriers that the individual telephone number is assigned to the requesting carrier.

20 Claims, 4 Drawing Sheets

(56) References Cited

U.S. PATENT DOCUMENTS

| | | | |
|---|---|---|---|
| 9,674,372 B2* | 6/2017 | Karnas | H04M 15/8061 |
| 2002/0136391 A1* | 9/2002 | Armstrong | H04M 3/2263 |
| | | | 379/242 |
| 2004/0024765 A1* | 2/2004 | Bauer | H04Q 3/005 |
| 2005/0220287 A1* | 10/2005 | Aures | H04Q 3/005 |
| | | | 379/221.13 |
| 2006/0193461 A1 | 8/2006 | Gavillet | |
| 2007/0203909 A1* | 8/2007 | Marathe | G06F 17/30324 |
| 2008/0063177 A1* | 3/2008 | Schultz | H04M 15/00 |
| | | | 379/220.01 |
| 2009/0259542 A1* | 10/2009 | Mishkovsky | G06Q 30/02 |
| | | | 705/14.1 |
| 2011/0182417 A1* | 7/2011 | Malyar | H04M 3/42297 |
| | | | 379/221.13 |
| 2014/0223283 A1* | 8/2014 | Hancock | G01C 21/32 |
| | | | 715/234 |
| 2016/0127567 A1* | 5/2016 | Kimmel | H04M 3/36 |
| | | | 379/114.21 |
| 2018/0005282 A1* | 1/2018 | Quimby | G06Q 30/0283 |
| 2018/0063177 A1* | 3/2018 | Yamada | H04L 63/1425 |
| 2018/0227429 A1 | 8/2018 | McGarry | |

\* cited by examiner

INDIVIDUAL TELEPHONE NUMBER ASSIGNMENT

TECHNICAL FIELD

The following disclosure relates to systems and methods for individual telephone numbering assignment and administration in a telecommunications network. Particularly, the following disclosure relates to the concept of acquiring individual telephone numbers for assignment to a user instead of acquiring a block of telephone numbers. Further, a novelty telephone number may be acquired.

BACKGROUND AND SUMMARY

The format of a US telephone number (TN) is NPA-NXX-XXXX. The first three digits is called the NPA (Numbering Plan Area) or area code. The first six digits of a TN is called the central office (CO) code. The full ten digits is called the line number, which is ultimately assigned to users. For example, for the telephone number (571) 434-5000, 571 is an area code assigned in Virginia, 571-434 is CO code assigned to Verizon Virginia, Inc. associated with the Herndon geographic area (e.g., rate center) and served from the switch HRDNVASTDS0, and 5000 is the line number assigned to the Neustar PBX. In some instances, the telephone number may be a non-geographic telephone number with no specifically associated geographic area. In such a case, the geographic area associated with the non-geographic telephone number would be, in effect, the entire country. When a user signs up for service, the service provider assigns a number from a pool of available numbers. Generally, these numbers are assigned at random. The available numbers are drawn from the blocks of numbers assigned to the service provider and consist of numbers not currently in use or which have not been used within a specific time period (e.g., preceding 90 days). In some geographic areas, all ten thousand telephone numbers in a CO code (NPA-NXX-0000 to 9999) are assigned to a service provider as inventory. In most geographic areas, one thousand telephone numbers identified by the first seven digits (NPA-NXX-X) are assigned to service providers as inventory. A service provider is required to acquire telephone numbers in such big blocks (one thousand or ten thousand). That is, even if the service provider needs one (or a handful) telephone number, it has to acquire a large block of telephone numbers. The existing system suffers from the disadvantage of being onerous to maintain because a service provider may be required to maintain a large inventory of numbers for a long period of time. As a result, extensive infrastructure may be required in terms of systems and personnel for numbering acquisition and management. The existing system also suffers from wastage because telephone numbers which are not assigned to a user remain unused. Moreover, the existing system does not allow a user to request a specific phone number (e.g., a novelty phone number) from the service provider.

BRIEF DESCRIPTION OF THE DRAWINGS

The foregoing and other objects, features, and advantages of the invention will be apparent from the following description of preferred embodiments as illustrated in the accompanying drawings. The drawings are not necessarily to scale. Emphasis instead has been placed upon illustrating the principles of the invention.

DETAILED DESCRIPTION

Based on the foregoing, it is evident that there exists a need for a system and method where a service provider can acquire individual telephone numbers instead of acquiring them in a block. There also exists a need to acquire a pre-determined telephone number (e.g., a novelty telephone number) instead of a random telephone number. An alternative solution is thus presented here that would utilize a numbering administrator for telephone number acquisition.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Further, the terminology used in the description presented below is intended to be interpreted in its broadest reasonable manner, even though it is being used in conjunction with a detailed description of certain specific examples of the technology. Certain terms may even be emphasized below, however, any terminology intended to be interpreted in any restricted manner will be overtly and specifically defined as such in this Detailed Description section.

Figure 1:
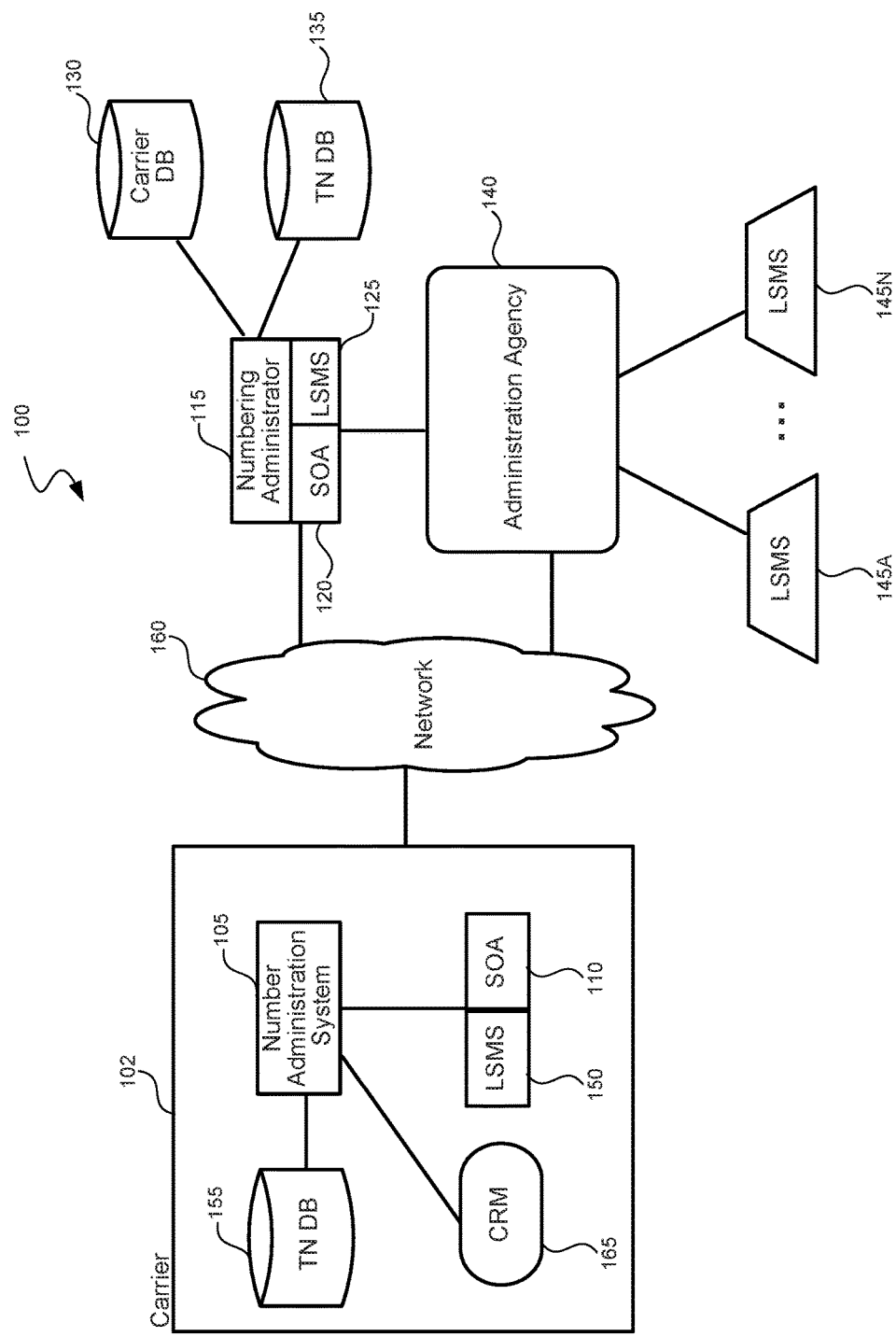
FIG. 1 is a block diagram illustrating an exemplary telephone number assignment system according to an illustrative embodiment of the invention.

FIG. 1 is a block diagram illustrating an exemplary telephone number assignment system 100 according to an illustrative embodiment of the invention. The telephone number assignment system 100 comprises of one or more carriers 102. A carrier 102 may comprise of a number administration system 105, a service order administrator 110, a database 155 and a customer resource management system 165. The database 155 may store telephone numbers and associated metadata (e.g., the assignment information related to the telephone number, assignment information, etc.). The customer resource management system 165 may interface with the number administration system 105. The number administration system 105 may maintain a repository of available and assigned telephone numbers in the database 155. The number administration system 105 may update an administration agency 140 (e.g., the Number Portability Administration Center (NPAC) in the United States) via a network 160, such as the Internet, using a Service Order Administrator (SOA) 110. In some embodiments of the invention, the carrier 102 may comprise one or more Local Service Management Systems (LSMS) 150. The LSMS 150 may receive changes to the information associated with telephone numbers. The carrier 102 may be connected to a numbering administrator 115 via the network 160. In some embodiments of the invention, the numbering administrator 115 and/or the administration agency 140 may be maintained as distributed registries (including, but not limited to, using blockchain technology). The numbering administrator 115 comprises of one or more SOA 120 and LSMS 125. The numbering administrator 115 may be connected to a carrier database 130 and a telephone number database 135. The carrier database 130 stores information related to one or more carriers, including, but not limited to, carrier name, carrier identifier, authorization details of carrier, forecast of demand, utilization of telephone number in specific geographic areas (e.g., rate centers), utilization of non-geographic telephone numbers, etc. The telephone number database 135 can be maintained by the numbering administrator 115 and stores information including an inventory of telephone numbers. For example, the telephone number database 135 may store available telephone numbers in particular geographic area. The SOA 120 at the numbering administrator may enable the creation of a number assignment with the administration agency 140. After changes are made to a telephone number (e.g., porting, assignment, change in switch, routing information, etc.), the administration agency 140 may communicate the change to one or more carriers using the LSMS 145A . . . 145N. In some embodiments of the invention, the information stored in the databases (e.g., the telephone number databases 155 and 135, and the carrier database 130) may be stored in the form of a blockchain. Telephone numbers may be associated with the numbering administrator 115 or for number administration, in general.

Figure 2:
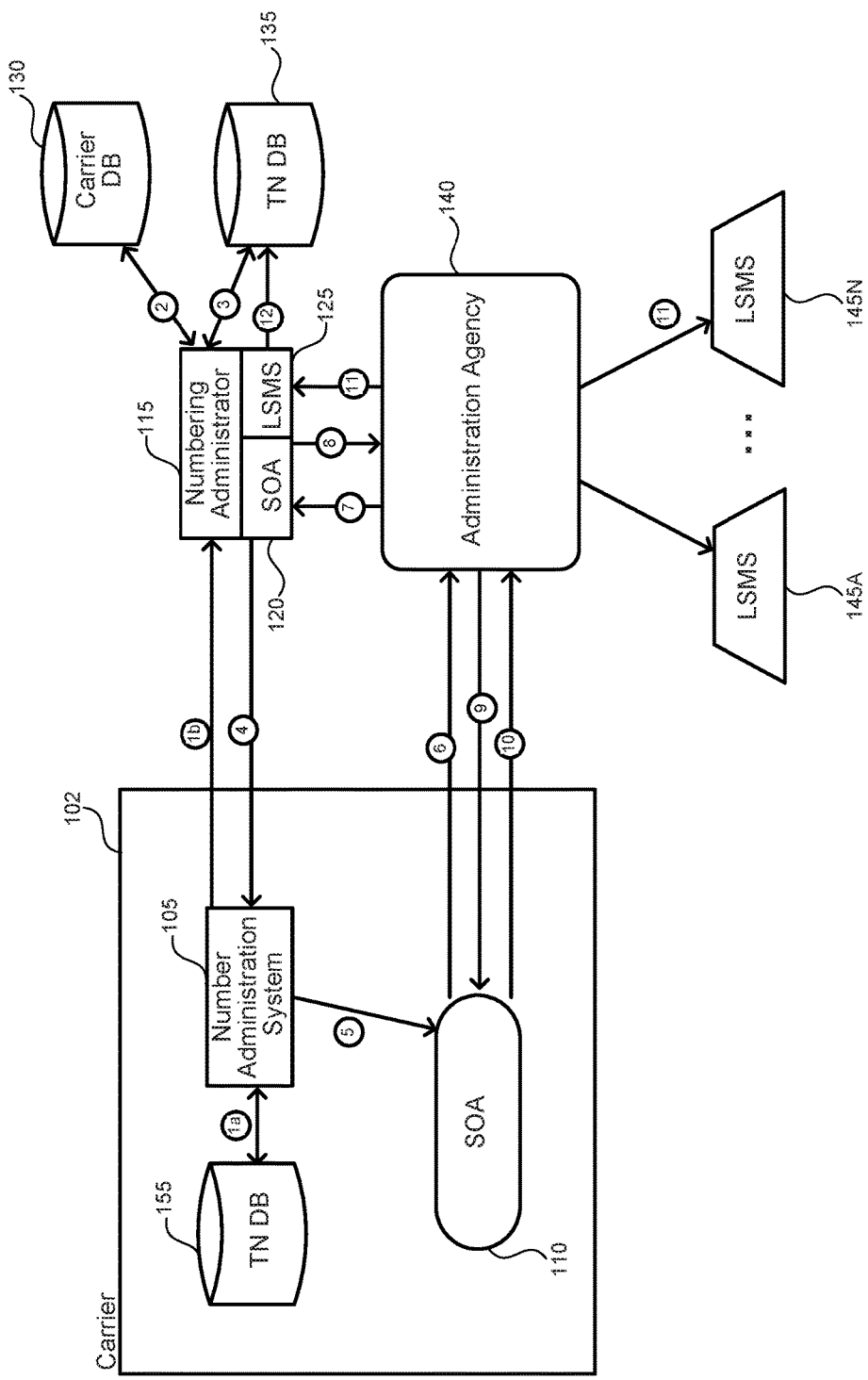
FIG. 2 illustrates some salient operations of an individual telephone number assignment method according to an illustrative embodiment of the invention.

FIG. 2 illustrates some salient operations of an individual telephone number assignment method according to an illustrative embodiment of the invention where a numbering administrator 115 assigns an individual telephone number to a user. In some embodiments of the invention, the numbering administrator 115 may drive the process of assigning an individual telephone number. The number administration system 105 of the carrier 102 may check, at step 1a, the availability of a telephone number by querying the telephone number database 155. If the requested telephone number is not available in the telephone number database 155, it may then send a request for the telephone number from the numbering administrator 115. As part of the request, the number administration system 105 may send, at step 1b, information related to the carrier (e.g., carrier identifier) and a specific geographic area for the telephone number. In some embodiments, the specific geographic area may be a non-geographic area (e.g., the entire country). The numbering administrator then, at step 2, verifies that the carrier 102 can request a resource (i.e., the telephone number) in the specific geographic area using the carrier database 130. The verification step comprises of one or more checks, including, but not limited to: the carrier has regulatory authority from, for example, the FCC, the state associated with the geographic area, etc.; the carrier has provided a forecast of demand; the carrier has reached a percent utilization threshold in the area of the requested telephone number; etc. One or more of these steps may be automated to increase the turn-around time (near real-time) and efficiency of the telephone number assignment system 100. The numbering administrator 115 may then, at step 3, obtain an individual telephone number from the telephone number database 135. In some embodiments where a particular telephone number is requested, the numbering administrator, at step 3, may verify that the requested telephone number is available for assignment. At step 4, the numbering administrator 115 provides the requested telephone number to the carrier 102.

The number administration 105 in the carrier 102 may then, at step 5, initiate an assignment to the requested telephone number via the SOA 110. The SOA, at step 6, communicates with the administration agency 140 to create an assignment. At step 7, the administration agency 140 informs the numbering administrator 115 of the assignment request, which may then be approved, at step 8, by the numbering administrator. Once the assignment request is approved, the administration agency 140, at step 9, informs the SOA 110 at the carrier 102 of the assignment approval. The SOA 110, at step 10, activates the assignment. For example, the SOA 110 may associate routing information (e.g., location routing number, non-geographic location routing number, etc.) with the requested telephone number as part of activating the assignment. The administration agency 140, at step 11, also updates the LSMSs 145A . . . 145N of each carrier and the LSMS of the numbering administrator 125 with the information related to the assignment. The numbering administrator, at step 12, also updates its telephone number database 135 with the information related to the assignment. For example, the telephone number inventory in the telephone number database 135 is updated to reflect the assignment of the requested telephone number to the carrier 102. In some embodiments of the invention, one or more of the steps (e.g., steps 5, 6, 9, 10, and 11) may be replaced by existing steps involved in number porting operations administered by, for example, the administration agency 140.

Figure 3:
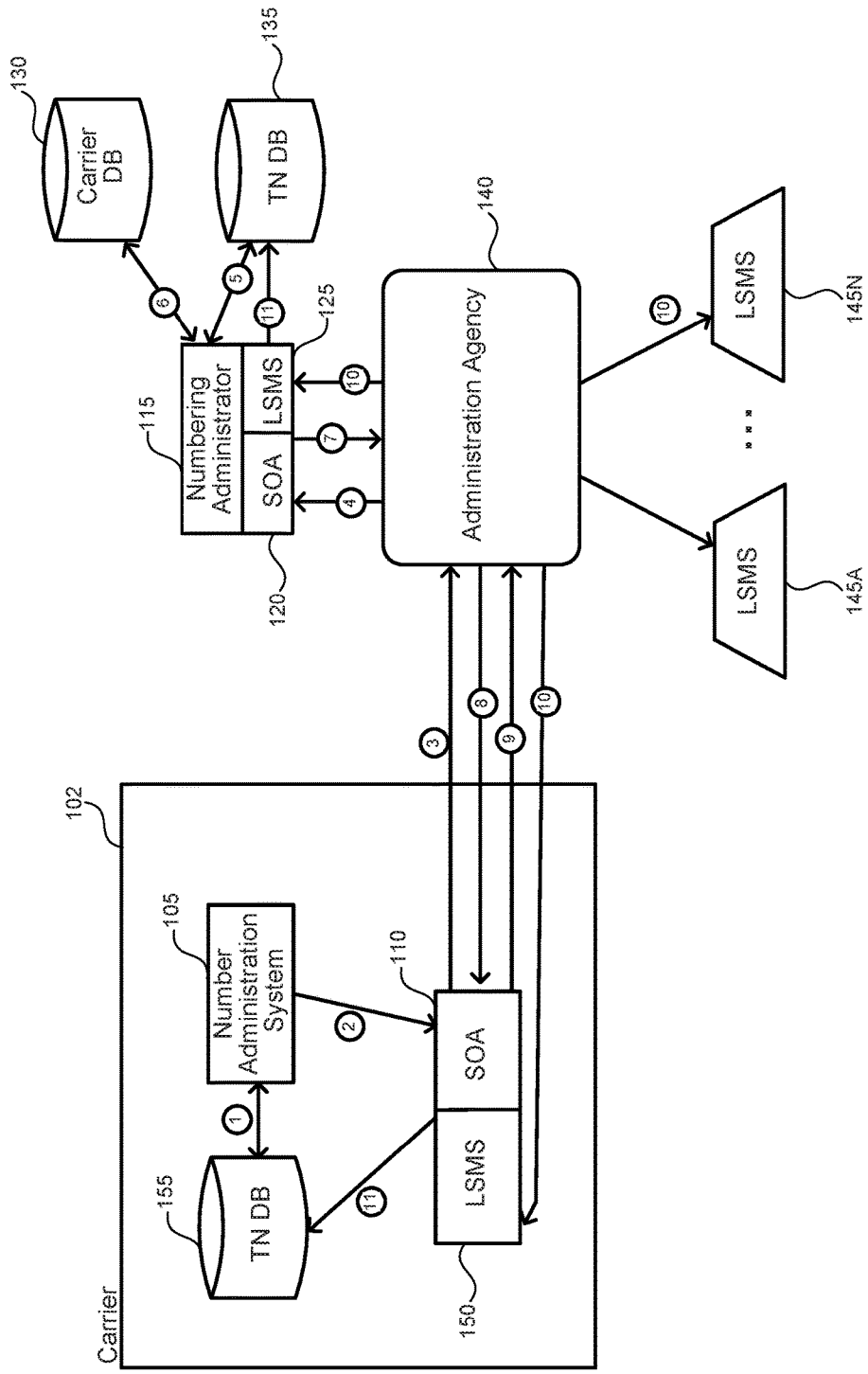
FIG. 3 illustrates some salient operations of an individual telephone number assignment method according to an illustrative embodiment of the invention.

FIG. 3 illustrates some salient operations of an individual telephone number assignment method according to an illustrative embodiment of the invention where a carrier 102 assigns an individual telephone number to a user. The number administration system 105 of a carrier 102 may query the telephone number database 155, at step 1, for an available telephone number for a particular geographic area. In some embodiments, the geographic area may be a non-geographic area (e.g., the entire country). In some embodiments of the invention, the number administration system 105 may request a specific pre-determined telephone number from the telephone number database 155. At step 2, the number administration system 105 may initiate an assignment of the requested telephone number via SOA 110. The SOA 110, at step 3, communicates with the administration agency 140 to create an assignment of the requested telephone number to the carrier 102. The administration agency 140 then contacts the numbering administrator 115, at step 4, that a carrier intends to perform an assignment of the requested telephone number. The numbering administrator 115 then determines, at step 5, the geographic area associated with the requested telephone number, by querying the telephone number database 135. In some embodiments, geographic area associated with the requested telephone number may be non-geographic. Upon receiving information related to the telephone number, including the associated geographic area, the numbering administrator 115, at step 6, queries the carrier database 130 to verify whether the carrier is qualified to receive the requested telephone number in the specified geographic area. Similar to step 2 in FIG. 2, the verification step comprises of one or more checks, including, but not limited to: the carrier has regulatory authority from, for example, the FCC, the state associated with the geographic area, etc.; the carrier has provided a forecast of demand; the carrier has reached a percent utilization in the area of the requested telephone number; etc. If the carrier 102 is qualified to receive the requested telephone number in the specific geographic area, the numbering administrator 115, at step 7, approves the assignment with the administration agency 140. Then, at step 8, the administration agency 140 notifies the carrier's SOA 110 of the assignment approval. The SOA 110, at step 9, activates the number assignment. For example, the SOA 110 may associate routing information (e.g., location routing number, non-geographic location routing number, etc.) with the requested telephone number as part of activating the number assignment. The administration agency 140, at step 10, also updates the LSMSs 145A . . . 145N of each carrier (including LSMS 150 of the requesting carrier 102) and the LSMS of the numbering administrator 125 with the information related to the assignment. The LSMSs of each carriers 150 and 145A . . . 145N may update the telephone number databases of the carrier (e.g., telephone number database 155) of the completed assignment. In some embodiments of the invention, one or more of the steps (e.g., steps 3, 8, 9, and 10) may be replaced by existing steps involved in number porting operations administered by, for example, the administration agency 140.

Figure 4:
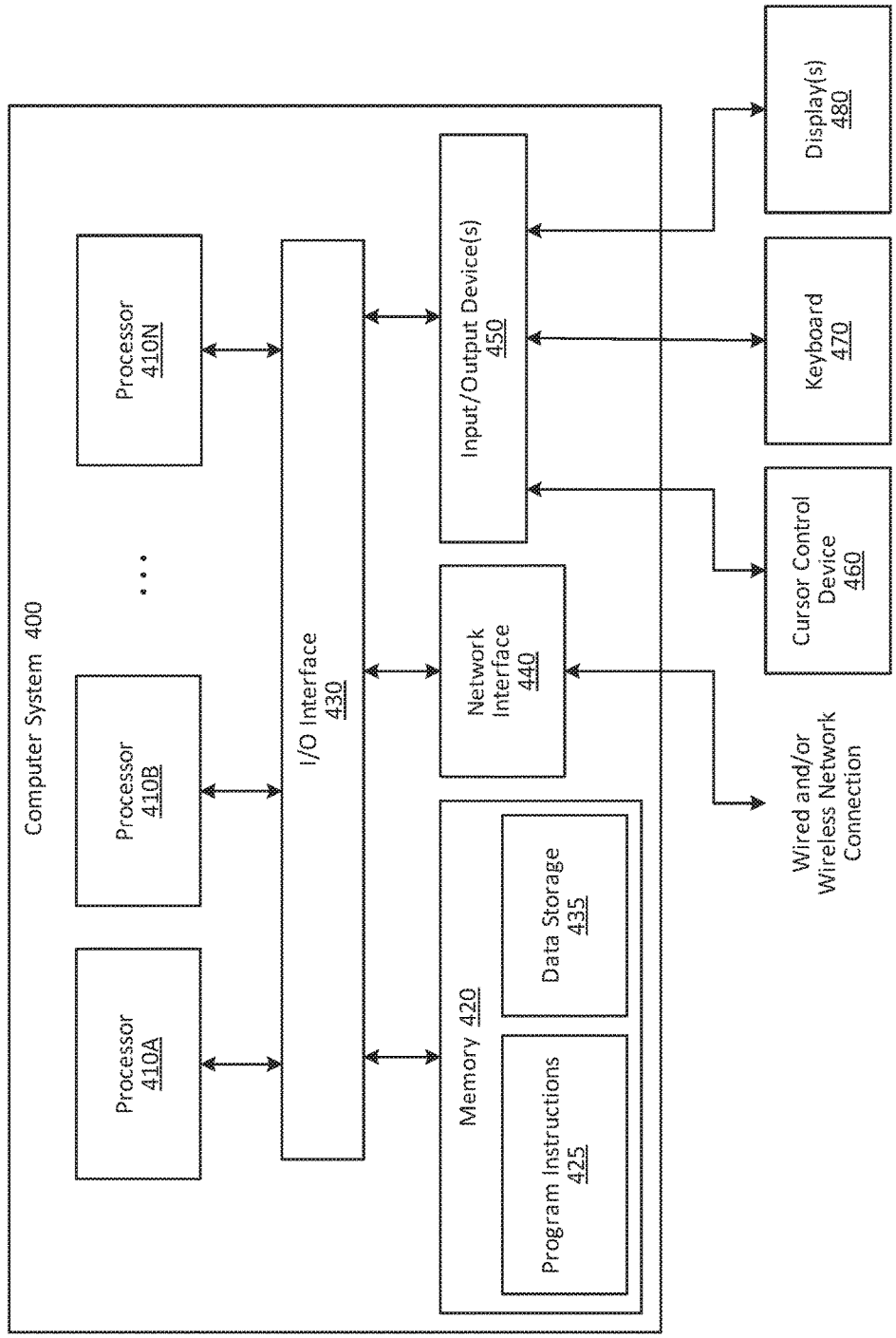
FIG. 4 illustrates the components of a computer system implementing the telephone number assignment system according to various embodiments.

FIG. 4 illustrates the components of a computer system implementing the telephone number assignment system according to various embodiments. The numbering administrator and/or the administration agency, illustrated in FIGS. 1, 2 and 3 may be implemented or executed, at least in part, by one or more computer systems. In various embodiments, computer system 400 may be a server, a workstation, a desktop computer, a laptop, a microcontroller, a system on a chip or the like. In some embodiments of the invention, computer system 400 may be implemented using a cloud-based infrastructure. In some embodiments, system 400 may be used to implement the individual telephone number assignment functionalities of FIGS. 2 and 3. As illustrated, computer system 400 includes one or more processor(s) 410A-N coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480.

In various embodiments, computer system 400 may be a single-processor system including one processor 410A, or a multi-processor system including two or more processors 410A-N (e.g., two, four, eight, or another suitable number). Processor(s) 410A-N may include any processor capable of executing program instructions. For example, in various embodiments, processor(s) 410A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 410A-N may commonly, but not necessarily, implement the same ISA.

System memory 420 may be configured to store program instructions (e.g., the real-time communications controller functions) and/or data accessible by processor(s) 410A-N. In various embodiments, system memory 420 may be implemented using any suitable memory technology, such as static random access memory (SRAM), synchronous dynamic RAM (SDRAM), non-volatile/Flash-type memory, or any other type of memory. As illustrated, program instructions and data implementing certain operations such as, for example, those described in connection with FIGS. 2 and 3, may be stored within system memory 420 as program instructions 425 and data storage 435, respectively. Additionally or alternatively, the real-time communications controller functions may be a software program that is stored within system memory 420 and is executable by processor(s) 410A-N. In other embodiments, program instructions and/or data may be received, sent or stored upon different types of computer-accessible media or on similar media separate from system memory 420 or computer system 400. Generally speaking, a computer-accessible medium may include any tangible or non-transitory storage media or memory media such as electronic, magnetic, or optical media—e.g., disk or CD/DVD-ROM coupled to computer system 400 via I/O interface 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 430 may be configured to coordinate I/O traffic between processor(s) 410A-N, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor(s) 410A-N). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments some or all of the functionality of I/O interface 430, such as an interface to system memory 420, may be incorporated directly into processor(s) 410A-N.

Network interface 440 may be configured to allow data to be exchanged between computer system 400 and other devices attached to a network, such as an embedded real-time client and one or more mobile devices. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, RFID readers, NFC readers, voice or optical recognition devices, or any other devices suitable for entering or retrieving data by one or more computer system 400. Multiple input/output devices 450 may be present in computer system 400 or may be distributed on various nodes of computer system 400. In some embodiments, similar input/output devices may be separate from computer system 400 and may interact with one or more nodes of computer system 600 through a wired or wireless connection, such as over network interface 440.

As shown in FIG. 4, memory 420 may include program instructions 425, configured to implement certain embodiments described herein, and data storage 435, comprising various data may be accessible by program instructions 425. In an embodiment, program instructions 425 may include software elements of embodiments illustrated in the above figures. For example, program instructions 425 may be implemented in various embodiments using any desired programming language, scripting language, or combination of programming languages and/or scripting languages (e.g., C, C++, C#, .NET, Java™, JavaScript™, Perl, etc.). Data storage 435 may include data that may be used in these embodiments (e.g., recorded communications, profiles for different modes of operations, etc.). In other embodiments, other or different software elements and data may be included.

The above description of the workings of this technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method for assigning a telephone number in a telecommunications network, wherein the telephone number is associated with a geographic area, the method comprising:
   receiving, at a numbering administrator that assigns telephone numbers to carriers, a request from a carrier to assign a telephone number to the carrier;
   verifying, at the numbering administrator, that the carrier is registered to receive the telephone number;
   transmitting a verification notification to the carrier, wherein the verification notification comprises the telephone number and an indication that the carrier is registered to receive the telephone number;
   receiving, at the numbering administrator, a notification that indicates an administrative agency has received a telephone number assignment request from the carrier, wherein the telephone number assignment request comprises the telephone number and carrier information that identifies the carrier, and wherein the administrative agency maintains a registry of telephone number routing information;
   processing, at the numbering administrator, the telephone number assignment request to generate a telephone number assignment response; and
   transmitting the telephone number assignment response from the numbering administrator to the administration agency, wherein the administration agency communicates with the carrier based on the telephone number assignment response.

2. The method of claim 1, wherein the request comprises at least one of:
   carrier identifier;
   carrier name; and
   geographic area.

3. The method of claim 1, wherein the numbering administrator communicates with a database to verify that the carrier is registered to receive the telephone number, wherein the database is communicatively coupled via a distributed network with the numbering administrator.

4. The method of claim 1, wherein the telephone number assignment response comprises an approval of the telephone number assignment request.

5. The method of claim 1, further comprising:
   receiving, at the numbering administrator, an update record from the administration agency, wherein the update record comprises data for the telephone number and the verified carrier; and
   updating telephone number data at the number administrator based on the update record.

6. The method of claim 1, wherein the carrier information comprises at least one of:
   carrier identifier;
   carrier name; and
   geographic area.

7. The method of claim 1, wherein the numbering administrator includes functions performed by the administrative agency.

8. A method for assigning a telephone number in a telecommunications network, wherein the telephone number is associated with a geographic area, the method comprising:
   receiving, at an administrative agency that administers routing of telephone numbers, a telephone number assignment request from a carrier, wherein the telephone number assignment request comprises the telephone number and information for the carrier, wherein the carrier is verified to receive the telephone number by a numbering administrator that assigns telephone numbers to carriers;
   transmitting the telephone number assignment request to the numbering administrator;
   receiving, at the administrative agency, a telephone number assignment response from the numbering administrator, wherein the numbering administrator processes the telephone number assignment request based on the carrier information; and
   transmitting the telephone number assignment response from the numbering administrator to the carrier.

9. The method of claim 8, wherein the telephone number assignment response comprises an approval of the telephone number assignment request.

10. The method of claim 8, further comprising:
    receiving, at the administrative agency, an assignment activation request for the telephone number from the carrier, wherein the assignment activation request comprises the telephone number and the carrier information.

11. The method of claim 10, further comprising:
transmitting an update record from the administrative agency, wherein the update record comprises the telephone number and the carrier information.

12. The method of claim 8, wherein the carrier information comprises at least one of:
carrier identifier;
carrier name; and
geographic area.

13. The method of claim 8, wherein the administrative agency is a Number Portability Administration Center (NPAC) and includes the numbering administrator.

14. A system for assigning a telephone number in a telecommunications network, wherein the telephone number is associated with a geographic area, the system comprising:
at least one hardware processor coupled to a network; and,
a memory configured to store processor-executable components, wherein the processor-executable components further comprises:
a component for receiving, at an administrative agency that administers routing of telephone numbers, a telephone number assignment request from a carrier, wherein the telephone number assignment request comprises the telephone number and information for the carrier, wherein the carrier is verified to receive the telephone number by a numbering administrator that assigns telephone numbers to carriers;
a component for transmitting the telephone number assignment request to the numbering administrator;
a component for receiving, at the administrative agency, a telephone number assignment response from the numbering administrator, wherein the numbering administrator processes the telephone number assignment request based on the carrier information; and
a component for transmitting the telephone number assignment response to the carrier.

15. The system of claim 14, wherein the telephone number assignment response comprises an approval of the telephone number assignment request.

16. The system of claim 14, further comprising:
a component for receiving, at the administrative agency, an assignment activation request for the telephone number from the carrier, wherein the assignment activation request comprises the telephone number and the carrier information.

17. The system of claim 16, further comprising:
a component for transmitting an update record from the administrative agency, wherein the update record comprises the telephone number and the carrier information.

18. The system of claim 14, wherein the carrier information comprises at least one of:
carrier identifier;
carrier name; and
geographic area.

19. The system of claim 14, wherein the administrative agency includes the numbering administrator.

20. The system of claim 14, wherein the numbering administrator further comprises at least one of:
a service order administrator;
a local service management system;
a carrier database, wherein the carrier database stores data of at least one carrier; and
a telephone number database, wherein the telephone number database stores data of telephone numbers.

* * * * *